(12) United States Patent
Stubbs et al.

(10) Patent No.: US 9,532,508 B1
(45) Date of Patent: Jan. 3, 2017

(54) TAGGING OF FRUIT-PRODUCING FLOWERS FOR ROBOTIC SELECTIVE HARVESTING

(71) Applicant: X DEVELOPMENT LLC, Mountain View, CA (US)

(72) Inventors: Mark Adrian Stubbs, Felton, CA (US); Kevin James Fleming McCloskey, Berkeley, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 0 days.

(21) Appl. No.: 14/697,375

(22) Filed: Apr. 27, 2015

(51) Int. Cl.
| | | |
|---|---|---|
| *A01G 17/00* | (2006.01) | |
| *A01G 1/00* | (2006.01) | |
| *G06K 9/20* | (2006.01) | |
| *G06K 9/78* | (2006.01) | |
| *G06T 7/00* | (2006.01) | |
| *G05B 19/042* | (2006.01) | |
| *A01D 46/30* | (2006.01) | |
| *A01G 7/00* | (2006.01) | |
| *A01C 21/00* | (2006.01) | |

(52) U.S. Cl.
CPC .............. *A01G 1/001* (2013.01); *A01C 21/00* (2013.01); *A01D 46/30* (2013.01); *A01G 7/00* (2013.01); *G05B 19/0425* (2013.01); *G06K 9/2063* (2013.01); *G06K 9/78* (2013.01); *G06T 7/004* (2013.01); *Y10S 901/01* (2013.01); *Y10S 901/31* (2013.01); *Y10S 901/47* (2013.01)

(58) Field of Classification Search
CPC .................................................. G06K 2209/17
See application file for complete search history.

(56) References Cited

U.S. PATENT DOCUMENTS

| | | | | |
|---|---|---|---|---|
| 4,015,366 A | * | 4/1977 | Hall, III | A01D 46/005 137/236.1 |
| RE31,023 E | * | 9/1982 | Hall, III | A01D 46/24 137/236.1 |
| 4,532,757 A | * | 8/1985 | Tutle | A01D 46/24 382/110 |

(Continued)

OTHER PUBLICATIONS

Intelligent sensing and manipulation for sustainable production and harvesting of high value crops, http://www.crops-robots.eu/; Webpage accessed Apr. 29, 2015; 1 page.

(Continued)

*Primary Examiner* — Jonathan L Sample
(74) *Attorney, Agent, or Firm* — Middleton Reutlinger

(57) ABSTRACT

The locations of flowers on a plant, rather than the locations of agricultural products produced from such flowers, are used to facilitate the performance of harvesting and other agricultural operations in robotic agricultural applications. In some implementations, the identified location of a fruit-producing flower may be used by a robotic device to apply an indicator tag to a flowering plant proximate the flower for later identification when performing various types of directed and automated agricultural operations. In other implementations, the identified location of a fruit-producing flower may be used by a robotic device to anchor a stem of a flowering plant to a predetermined location such that the location of the flower, and of any fruit(s) later produced by such flower, are controlled and/or known when performing subsequent agricultural operations.

22 Claims, 6 Drawing Sheets

(56) References Cited

U.S. PATENT DOCUMENTS

| | | | | |
|---|---|---|---|---|
| 4,663,925 | A * | 5/1987 | Terada | A01D 46/24 382/153 |
| 4,873,644 | A | 10/1989 | Fujii et al. | |
| 5,987,862 | A * | 11/1999 | Long | A01G 7/06 47/1.7 |
| 6,442,920 | B1 * | 9/2002 | Peterson | A01D 46/26 56/328.1 |
| 6,671,582 | B1 * | 12/2003 | Hanley | A01B 51/02 250/339.11 |
| 6,756,789 | B1 * | 6/2004 | Parker | A01G 23/00 324/637 |
| 7,096,090 | B1 * | 8/2006 | Zweig | G05D 1/0022 700/245 |
| 7,765,780 | B2 * | 8/2010 | Koselka | A01D 46/30 56/10.2 A |
| 8,150,554 | B2 * | 4/2012 | Anderson | G06Q 50/06 47/1.5 |
| 8,321,365 | B2 * | 11/2012 | Anderson | G06N 5/02 706/46 |
| 9,226,446 | B2 * | 1/2016 | Moore | |
| 9,357,708 | B2 * | 6/2016 | Chang | A01D 46/26 |
| 2003/0070409 | A1 * | 4/2003 | Adams | A01D 46/005 56/328.1 |
| 2004/0200146 | A1 * | 10/2004 | Leyns | A01G 9/143 47/65 |
| 2005/0126144 | A1 * | 6/2005 | Koselka | A01D 46/30 56/10.2 R |
| 2006/0213167 | A1 * | 9/2006 | Koselka | A01D 46/30 56/10.2 A |
| 2007/0061041 | A1 * | 3/2007 | Zweig | G05D 1/0261 700/245 |
| 2007/0135962 | A1 * | 6/2007 | Kawabe | G01S 17/74 700/225 |
| 2009/0231101 | A1 * | 9/2009 | Hyde | H04Q 9/00 340/10.1 |
| 2010/0268562 | A1 * | 10/2010 | Anderson | G06Q 10/06315 705/7.25 |
| 2010/0268679 | A1 * | 10/2010 | Anderson | G06N 5/02 706/46 |
| 2011/0047951 | A1 * | 3/2011 | Moore | A01D 46/24 56/234 |
| 2012/0020531 | A1 | 1/2012 | Owens et al. | |
| 2012/0152877 | A1 * | 6/2012 | Tadayon | B25J 5/02 212/224 |
| 2013/0021157 | A1 * | 1/2013 | Teeter | G09F 3/0335 340/572.3 |
| 2013/0094717 | A1 | 4/2013 | Janni et al. | |
| 2013/0325346 | A1 | 12/2013 | McPeek | |
| 2014/0168412 | A1 * | 6/2014 | Shulman | H04N 7/18 348/89 |
| 2014/0314280 | A1 * | 10/2014 | Lee | G06K 9/00697 382/110 |
| 2015/0015697 | A1 * | 1/2015 | Redden | G01N 33/0098 348/89 |
| 2015/0027044 | A1 * | 1/2015 | Redden | A01M 21/046 47/58.1 R |
| 2015/0186387 | A1 * | 7/2015 | Funabashi | G06Q 50/02 707/723 |
| 2016/0050852 | A1 * | 2/2016 | Lee | A01D 46/30 47/1.44 |
| 2016/0073584 | A1 * | 3/2016 | Davidson | A01D 46/30 56/328.1 |
| 2016/0120124 | A1 * | 5/2016 | De Kleine | A01D 46/264 56/329 |
| 2016/0193729 | A1 * | 7/2016 | Williams | H04B 1/0092 700/258 |

OTHER PUBLICATIONS

Cherry Harvester, https://www.youtube.com/watch?v=UX_t1hkqTVQ; Webpage accessed Apr. 29, 2015; 2 pages.

Tomato harvesting machine in action, http://www.youtube.com/watch?v=R3EpFTyN26E; Webpage accessed Apr. 29, 2015; 3 pages.

McCarthy, et al. "Applied machine vision of plants—a review with implications for field deployment in automated farming operations." Intelligent Service Robotics 3.4 (2010): 209-217.

Kapach, Keren, et al. "Computer vision for fruit harvesting robots—state of the art and challenges ahead." International Journal of Computational Vision and Robotics 3.1 (2012): 4-34.

* cited by examiner

TAGGING OF FRUIT-PRODUCING FLOWERS FOR ROBOTIC SELECTIVE HARVESTING

BACKGROUND

Robotic and/or automated systems are increasingly being contemplated for the agricultural industry to improve productivity in planting, growing and/or harvesting crops. One particular application for which such systems may be of use is that of selective harvesting, where agricultural products are harvested from plants without entirely destroying the plants. Proposed robotic and/or automated approaches to selective harvesting, however, have generally relied on complex machine perception systems and hardware end-effectors that are customized for particular types of crops, and that are generally unsuitable for use with other types of crops. As an example, a machine perception system optimized to identify a green bell pepper is generally unsuitable for identifying other types of agricultural products, such as strawberries, as the agricultural products generally share little commonality across different types of crops. Moreover, for many crops, identification of an agricultural product for harvest may be complicated by the fact that the agricultural product itself is difficult to distinguish from its surrounding foliage. A green bell pepper, for example, is often nearly the same color as the leaves of a pepper plant, so color is generally not a distinguishing characteristic that can be relied upon to identify a green bell pepper for harvest.

SUMMARY

This specification is directed generally to methods and apparatus that rely on the locations of flowers on a plant, rather than the locations of agricultural products produced from such flowers, to facilitate the performance of harvesting and other agricultural operations. In particular, a wide variety of agricultural crops for which selective harvesting may be used are classified as angiosperms, or flowering plants, whereby the agricultural products produced by such crops (e.g., vegetables, nuts, legumes, grains, culinary fruits) are botanically considered to be fruits that are produced from flowers as part of the natural reproductive cycle of such crops. Such fruit-producing flowers are believed to be more distinguishable from surrounding foliage than their associated agricultural products in many instances, and thus are more amenable to detection by a machine perception system. Furthermore, such fruit-producing flowers are also believed to share greater commonality across different types of crops than their associated agricultural products, reducing the likelihood that customization or tuning is required to adapt a flower detection algorithm for use with a particular type of crop.

In some implementations, the location of a fruit-producing flower may be identified and used by a robotic device to apply an indicator tag to a flowering plant proximate the flower. By doing so, the indicator tag may later be identified to facilitate the performance of various types of agricultural operations directed to the location of the indicator tag, and as such, directed to the location of the flower and/or any fruit(s) later produced by such flower.

In other implementations, the location of a fruit-producing flower may be identified and used by a robotic device to anchor a stem of a flowering plant to a predetermined location. By doing so, the location of the flower, and of any fruit(s) later produced by such flower, are controlled and/or known when performing subsequent agricultural operations.

Therefore, in some implementations, a method may be provided that includes receiving digital image data of at least a portion of a flowering plant, processing the received digital image data to identify a location of a fruit-producing flower on the flowering plant, and prior to production of a fruit by the fruit-producing flower, applying an indicator tag to the flowering plant proximate the identified location of the fruit-producing flower using a robotic device, the indicator tag being configured for detection by a machine perception system to identify a location of the fruit produced by the fruit-producing flower.

This method and other implementations of technology disclosed herein may each optionally include one or more of the following features.

In some implementations, the method further includes locating the indicator tag with the machine perception system, and performing a directed and automated agricultural operation on the flowering plant proximate the indicator tag. In some implementations, applying the indicator tag includes controlling an end-effector of the robotic device to apply the indicator tag to a stem of the flowering plant proximate the fruit-producing flower. In addition, in some implementations, performing the directed and automated agricultural operation includes harvesting the fruit, and in some implementations, harvesting the fruit includes manipulating the indicator tag to sever the stem and thereby separate the fruit from the flowering plant.

In some implementations, the indicator tag includes a collapsible loop that circumscribes the stem, and manipulating the indicator tag includes collapsing the collapsible loop to sever the stem. Further, in some implementations, the indicator tag includes a cable tie portion including a cable that projects through a catch to define the collapsible loop, controlling the end-effector of the robotic device to apply the indicator tag includes drawing the cable through the catch to a first position, and manipulating the indicator tag to sever the stem includes drawing the cable further through the catch beyond the first position. Further, in some implementations, the cable tie portion includes at least one cutting element configured to cut the stem when the cable is further drawn through the catch.

In some implementations, at least a portion of the indicator tag is reflective, and locating the indicator tag includes detecting a reflection of electromagnetic radiation with the machine perception system. Further, in some implementations, locating the indicator tag further includes emitting the electromagnetic radiation with the machine perception system, while in some implementations, the indicator tag includes a reflector element that is reflective in multiple directions. In some implementations, the indicator tag is configured to hang the reflector element below the stem and below an occluding structure of the flowering plant.

In some implementations, the directed and automated agricultural operation includes pollinating the fruit-producing flower, capping the fruit-producing flower to inhibit pollination, transfecting the fruit-producing flower, performing a targeted application of an agricultural fertilizer, pesticide or herbicide to the flowering plant, moving and affixing the stem of the flowering plant to a predetermined location, monitoring growth of the fruit, or determining ripeness of the fruit.

In some implementations, the method further includes storing the location of the fruit-producing flower, where locating the indicator tag with the machine perception system includes retrieving the location of the fruit-producing flower to narrow a search space for locating the indicator tag with the machine perception system. Further, in some implementations, the robotic device is a first robotic device, and wherein locating the indicator tag and performing the directed and automated agricultural operation on the flowering plant are performed by the first robotic device or a second robotic device. In some implementations, receiving the digital image data and processing the received digital image data are performed by the robotic device, and in some implementations, the fruit comprises a vegetable agricultural product, a fruit agricultural product, or a nut agricultural product. In addition, in some implementations, the indicator tag comprises a Volatile Organic Compound (VOC) sensor.

In some implementations, a method may be provided that includes receiving digital image data of at least a portion of a flowering plant, processing the received digital image data using a machine perception system to identify a location of an indicator tag applied to the flowering plant proximate a fruit on the flowering plant and prior to production of the fruit by a fruit-producing flower on the flowering plant, and performing a directed and automated agricultural operation on the flowering plant proximate the indicator tag.

In some implementations, an apparatus may be provided that includes a robotic device including an end-effector configured to apply an indicator tag to a flowering plant, and a control system coupled to the robotic device and configured to receive digital image data of at least a portion of the flowering plant, process the received digital image data to identify a location of a fruit-producing flower on the flowering plant, and prior to production of a fruit by the fruit-producing flower, apply the indicator tag to the flowering plant proximate the identified location of the fruit-producing flower, where the indicator tag is configured for detection by a machine perception system to identify a location of a fruit produced by the fruit-producing flower on the flowering plant.

In some implementations, the robotic device further includes an image capture device configured to collect the digital image data.

In some implementations, an apparatus may be provided that includes a robotic device including an image capture device and an end-effector, the image capture device configured to collect digital image data of at least a portion of a flowering plant, where the flowering plant includes an indicator tag applied thereto proximate a fruit on the flowering plant and prior to production of the fruit by a fruit-producing flower on the flowering plant, the end-effector configured to perform a directed and automated agricultural operation on the flowering plant proximate the indicator tag, and a control system coupled to the image capture device and the end-effector of the robotic device and configured to process the collected digital image data to identify a location of the indicator tag and control the end-effector to perform the directed and automated agricultural operation on the flowering plant proximate the indicator tag.

In some implementations, a method may be provided that includes receiving digital image data of at least a portion of a flowering plant, processing the received digital image data to identify a location of a fruit-producing flower on the flowering plant, prior to production of a fruit by the fruit-producing flower, anchoring a stem of the flowering plant proximate the identified location of the fruit-producing flower to a predetermined location using a robotic device, and after production of the fruit by the fruit-producing flower, performing an agricultural operation on the flowering plant with the stem of the flowering plant anchored in the predetermined location.

In some implementations, the agricultural operation includes harvesting the fruit with the stem of the flowering plant anchored in the predetermined location, while in some implementations, the method further includes processing received digital image data for a plurality of flowering plants to identify locations of a plurality of fruit-producing flowers and using the identified locations to control the end-effector of the robotic device to anchor a plurality of stems proximate the plurality of fruit-producing flowers to a plurality of predetermined locations, where performing the agricultural operation includes performing a cutting operation along a predetermined path between the plurality of predetermined locations to harvest fruit from the plurality of flowering plants.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
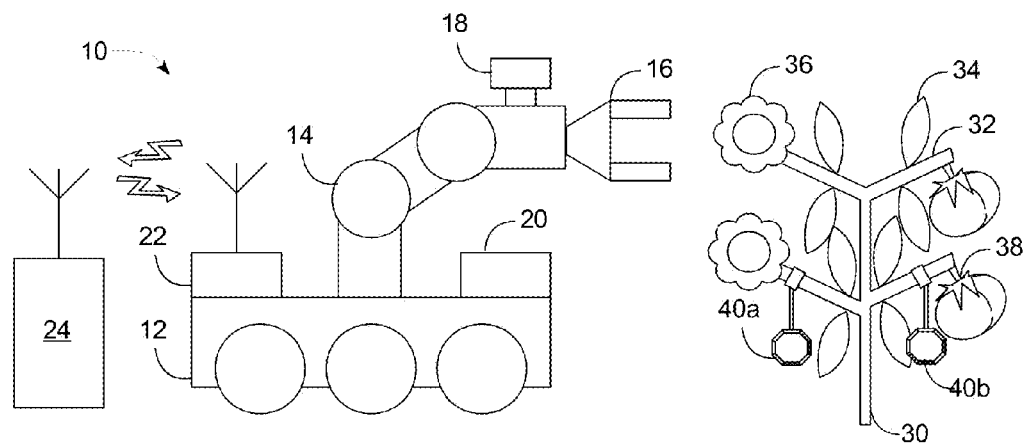
FIG. 1 illustrates an example robotic agricultural system.

Implementing robotics for selective harvesting of agricultural products is often complicated by the complexity of the machine perception systems needed to identify and locate such agricultural products when harvesting a crop. Different agricultural products can have significantly different appearances, and in some cases, the agricultural products may be difficult to distinguish from surrounding foliage. As one example, tomatoes, bell peppers and strawberries all have significantly different appearances, and detection of the locations of such products for selective harvesting by a robotic system may require different image recognition or machine perception algorithms optimized for those individual products. When combined with a need for different end-effectors customized to harvest particular types of products, the costs and engineering efforts required to implement robotic selective harvesting systems can be prohibitive in some instances.

On the other hand, however, it has been found that different agricultural products do share some common characteristics. In particular, many types of agricultural crops are botanically classified as angiosperms, which are otherwise referred to herein as flowering plants. The reproductive cycle of an angiosperm generally begins with the development of reproductive organs that are commonly known as flowers, and that after fertilization develop or mature into fruit, the means by which the angiosperm disseminates its seeds. While the term "fruit" is more commonly used in a culinary sense to refer to agricultural products such as apples, bananas, strawberries, etc., from a botanical perspective, a fruit is generally considered to be the mature ovary or ovaries of one or more flowers, and as such also refers to a large number of other types of agricultural products, including many nuts, legumes, grains and vegetables. As such, references hereinafter to a "fruit" will generally refer to fruits in the botanical, rather than the culinary sense.

Furthermore, it has been found that flowers tend to be much more self-similar across different types of crops than the agricultural products produced by those crops, e.g., the flower of a strawberry plant looks more like that of a bell pepper than a strawberry looks like a pepper. In addition, due in part to the evolutionary purpose of a flower in terms of attracting insects for pollination purposes, flowers tend to be more distinguishable from the surrounding foliage of a crop than do the fruits. A bell pepper, for example, may be a similar shade of green as the leaves of a pepper plant, whereas the flower of a pepper plant is generally white in color, with pronounced petals having shapes that are similar to those of many types of flowers.

Therefore, in various implementations discussed hereinafter, the locations of fruit-producing flowers, rather than of the fruits themselves, may be identified and used for later harvesting of the fruits after maturation of the flowers into fruits and/or for performing other agricultural operations that are directed or targeted towards the flowers and/or the fruits.

In this regard, a fruit-producing flower may be considered to be any flower-like structure of a flowering plant, or angiosperm, that produces one or more botanical fruits proximate the location of the flower, such that the location of the flower is indicative of the location of a fruit produced by that flower. It will be appreciated that for some plants, a one-to-one correspondence between flowers and fruits may exist, whereas for other plants, a one-to-many or many-to-one correspondence may exist between flowers and fruits, and moreover, in some plants, flowers and/or fruits may be clustered together into visually-perceptible groupings. As one example, the flowers from a grapevine are generally clustered together into inflorescences that produce clusters of grapes, and in such instances, detection and location of a flower may correspond to detection and location of an inflorescence of flowers. In addition, a fruit may correspond to various types of agricultural products, including vegetable agricultural products, fruit agricultural products, legume agricultural products, nut agricultural products, or grain agricultural products, among others.

In some implementations, for example, a machine perception system may be used to detect fruit-producing flowers of flowering plants such that the locations of such flowers may be identified, and such that indicator tags may be applied to the flowering plants proximate the locations of such flowers by a robotic system. Thereafter, the indicator tags may be detected by a machine perception system (which may be the same as or different from the machine perception system used to detect the flowers), with the detected locations of the indicator tags used to perform directed and automated agricultural operations on the flowering plants. The agricultural operations may include operations such as harvesting, pollinating, transfecting, capping to inhibit pollination, monitoring, determining ripeness, and targeted applications of agricultural chemicals such as fertilizer, pesticide, herbicide, etc. As such, as used herein, a directed and automated agricultural operation may be considered to include any agricultural operation that is at least partially automated, e.g., performed at least in part using an autonomous or semi-autonomous robotic device, and that is directed or targeted to a particular location of a flower and/or fruit on a plant.

A machine perception system, in this regard, may include any computational system or device incorporating hardware and/or software configured to process sensory data collected from an environment and to ascertain or perceive information about the environment. In the implementations discussed hereinafter, for example, a machine perception system includes at least computer vision functionality capable of processing image data of a scene captured by an image capture device to detect or perceive particular objects in the scene. A machine perception system may be wholly implemented within a robotic device, wholly implemented within a remote computational device in communication with a robotic device, or collaboratively implemented with some functionality allocated to both a robotic device and one or more remote computational devices.

FIG. 1, for example, illustrates an example robotic agricultural system 10 including a robotic device 12 having a robotic arm 14 to which is coupled an end-effector 16, along with an image capture device 18 suitable for capturing digital image data for processing by a machine perception system. A control system 20 may be used to control the various components in robotic device 12, and in some implementations, a communications interface 22 may be provided to enable robotic device 12 to communicate with a remote system 24. Part or all of control system 20 may be remote from robotic device 12 in some implementations, so a control system is not required to be fully implemented within a robotic device in some implementations.

Robotic system 10, in this implementation may be used to perform agricultural operations on a crop consisting of one or more plants, e.g., plant 30 as illustrated in FIG. 1. Plant 30 is a flowering plant, in this instance a tomato plant, and includes stems or branches 32 and leaves 34 forming the structural support and foliage of the plant. Also illustrated in FIG. 1 are flowers 36 and fruits 38, which though both are illustrated in FIG. 1 for ease of illustration, are generally present at different points in time during the development of a plant. In particular, fruits 38 are generally produced by flowers 36 as a part of the natural reproductive cycle of the plant, and the location of a flower 36 on a stem is generally indicative of the location of the fruit 38 produced by that flower.

As will become more apparent below, indicator tags may be applied to a plant by a robotic device proximate the locations of flowers on the plant such that the tags may be used to later assist in locating fruits produced by those flowers. Tag 40a, for example, is illustrated in FIG. 1 after application proximate a flower 36, whereas tag 40b is illustrated in FIG. 1 after application proximate a flower that has thereafter produced a fruit 38, such that tag 40b has become indicative of the location of the fruit rather than the flower that existed when the tag was originally applied.

Figure 2:
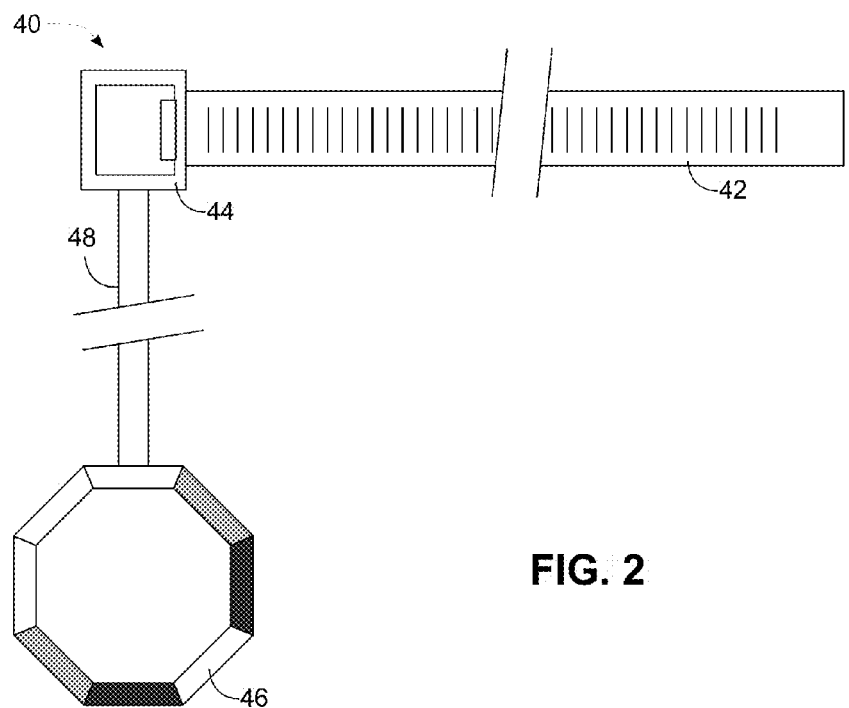
FIG. 2 is a top plan view of an example indicator tag capable of being used with the robotic agricultural system of FIG. 1.

As illustrated in FIG. 2, an indicator tag 40 may include structure for securing the tag to a plant as well as structure that may be identified by a robotic device to thereby identify the location of a flower or fruit with which the tag is associated. Tag 40, for example, is configured as a cable tie including a cable tie portion with a cable 42 and a catch 44 configured to receive cable 42 and form a collapsible loop to circumscribe a stem of a plant. Tag 40 also includes an indicator portion having one or more reflector elements 46 coupled to the cable tie portion by a connector 48.

Figure 3:
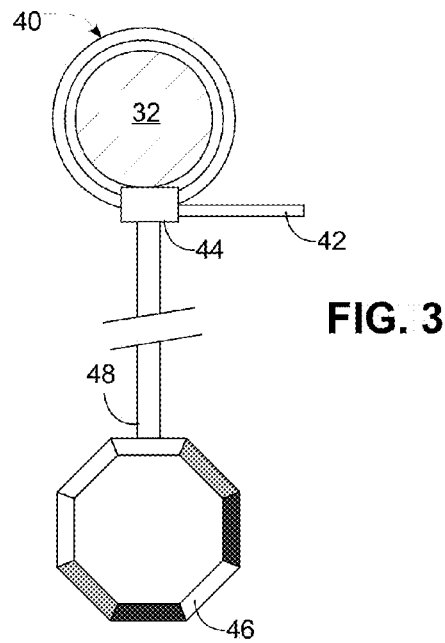
FIG. 3 illustrates the application of the indicator tag of FIG. 2 to the stem of a plant.

As illustrated in FIG. 3, in use cable 42 is wrapped around a stem 32 and is received within catch 44 to fully circumscribe the stem. Cable 42 thereby forms a loop that is collapsible by drawing the cable further through catch 44, and catch 44 may be configured to resist removal of cable 42 from the catch, thereby retaining tag 40 on the stem.

In some implementations, the cable tie portion may also be configured to assist with severing stem 32, e.g., to separate and harvest the fruit from a plant. In the implementation of FIGS. 2-3, for example, cable 42 may be drawn further through catch 44 until the compressional force applied by the loop formed by the cable is sufficient to sever the stem. Thus, the cable may be initially drawn through the catch to a position that is sufficient to hold the indicator tag on the stem until it becomes desirable to sever the stem, at which time the stem may be severed by drawing the cable further through the catch.

Figure 4:
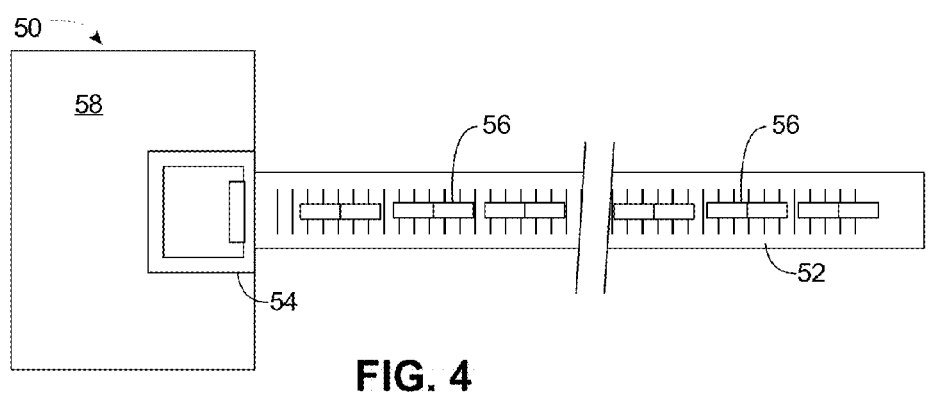
FIG. 4 is a top plan view of an another example indicator tag capable of being used with the robotic agricultural system of FIG. 1.
Figure 5:
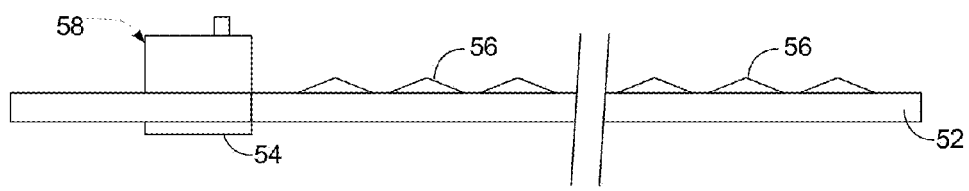
FIG. 5 is a side elevational view of the indicator tag of FIG. 4.

Moreover, as illustrated in FIGS. 4 and 5, another implementation of an indicator tag 50 may include a cable tie portion including a cable 52 and catch 54, and additionally with one or more cutting elements 56 formed on the cable 52 to assist with cutting a stem of a plant, which may be of use in implementations where stems are woody or otherwise difficult to sever through compression alone. Various types of cutting elements, including blades, teeth, barbs, razor wire, serrations, etc. may be used in different implementations.

Other indicator tags may utilize other mechanisms to secure an indicator tag to a plant, including adhesives, looped or wrapped strings or wires, clamps, etc.

Returning to FIGS. 2 and 3, in some implementations, indicator tags may be specifically constructed to facilitate their identification by a machine perception system, which effectively reduces the complexity required to detect the indicator tags. For indicator tag 40, for example, a passive reflector element 46 may be used to reflect ambient electromagnetic radiation (e.g., visible light), or to reflect emitted electromagnetic radiation (e.g., as may be emitted by a focused light source on robotic device 12) and thereby distinguish the indicator tag from the surrounding foliage of the plant. In one implementation, passive reflector element 46 may be a multi-faceted and mirrored spherical object, similar to a disco ball, to enable the tag to be detected regardless of the orientation of the tag. In other implementations, however, other geometric shapes and reflective surfaces may be used.

In addition, in some implementations it may be desirable to provide connectors 48 with sufficient length to position reflector elements 46 away from foliage or other occluding structures of a plant. For example, for indicator tags applied to a tree having a dense canopy, it may be desirable to hang the reflector elements below the canopy to facilitate detection. Furthermore, the reflector elements may be configured to be grasped by an end-effector of a robotic device such that even when the reflector elements are some distance away from the locations of the flowers or fruits proximate which the indicator tags are applied, the locations may nonetheless be found by following along the connectors starting at the reflector elements.

In other implementations, however, separate reflector elements may not be used, a reflective surface may be provided on an indicator tag to facilitate detection. As illustrated in FIGS. 4 and 5, for example, a reflective tab 58 may be coupled to catch 54.

It will be appreciated that indicator tags may vary in other implementations. For example, rather than passive reflector elements or surfaces, indicator tags may be provided with active components, e.g., to emit electromagnetic radiation such as light, to communicate identification signals and other data (e.g., using active or passive RFID components), to perform monitoring or sensing operations (e.g., incorporating Volatile Organic Compound (VOC) sensors to monitor fruit ripeness), or to perform other functions in addition to facilitating the location of a flower or fruit. In addition, in some implementations indicator tags may be single use, while in other implementations indicator tags may be recovered and reused.

It will also be appreciated that an end-effector of a robotic device may be designed and used to apply indicator tags in a manner appropriate for the particular type of indicator tag being used, as well as that the same end-effector or different end-effectors may be designed and used to perform additional operations such as grabbing or grasping an indicator tag and/or fruit, recovering an indicator tag for reuse, severing a stem, harvesting a fruit, applying an agricultural chemical such as a pesticide, herbicide or fertilizer, capping a flower, transfecting a flower, pollinating a flower, etc.

Further, in some implementations, a source of electromagnetic radiation, as well as the reflective properties of indicator tags, may also be tailored to further facilitate detection, e.g., to restrict detection to particular wavelengths of light, or to use particular wavelengths that are less likely to be reflected by plant matter and/or to which the plant matter is transparent, such that indicator tags may be located more easily within dense foliage irrespective of leaf occlusion in the visible spectrum.

Figure 6:
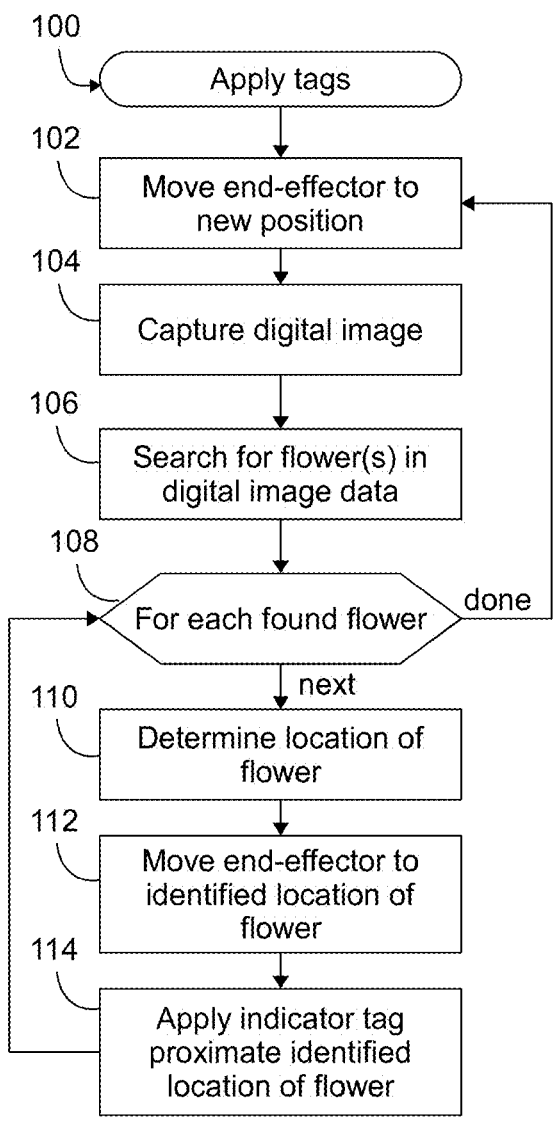
FIG. 6 is a flowchart illustrating an example method of applying an indicator tag.

FIG. 6 illustrates an example method 100 for applying an indicator tag. Method 100 may be performed, for example, by a robotic device within a field or growing facility, and the operations may be performed by the robotic device in a full autonomous matter in some implementations, while in other implementations the operations may be performed by a semi-autonomous robotic device, e.g., a robotic device mounted on human-controlled machinery. In addition, in some implementations all of the computational operations may be performed locally by a robotic device, while in other implementations a robotic device may be in communication with a remote computer system that handles a portion of the computational operations. In one implementation, for example, digital image processing and recognition to identify flowers in digital image data may be performed remotely to leverage high performance computational resources in a remote computer system.

In one implementation, it is assumed that a robotic device performs method 100, and that the robotic device includes an end-effector configured to apply an indicator tag to a stem of a flowering plant, as well as an image capture device, e.g., a digital camera, mounted to the end-effector or to a robotic arm to which the end-effector is mounted. Method 100 begins in block 102 by moving the end-effector to a new position, e.g., by moving the end-effector itself and/or moving the entire robotic device to a new position relative to a flowering plant or to a new flowering plant. Then, in block 104, a digital image is captured, and in block 106, the digital image data from the digital image is processed to search for one or more flowers in the captured image. In block 106, a flower recognition algorithm may be used to attempt to locate any flowers in the captured image. In some implementations, the flower recognition algorithm may be tuned or trained on the flowers of a particular species of flowering plant, while in other implementations, the flower recognition algorithm may be usable with the flowers of many different species, given that many flowers share common visual cues such as the presence of petals and typically a stark difference in color from surrounding foliage. In addition, in some implementations, a flower recognition algorithm may also be configured to ignore flowers not meeting an acceptance criterion, e.g., to avoid applying tags to flowers that are underdeveloped or that are too close to other flowers.

Next, in block 108, a FOR loop is performed to process each flower located in the captured digital image. For each such flower, the location of the flower in a three-dimensional space may be identified in block 110, and the end-effector may be moved to the identified location of the flower in block 112. It will be appreciated that the identification of the location of the flower and the movement of the end-effector may be an iterative process in some implementations, e.g., whereby new digital images are captured as the end-effector is moved toward the flower to assist in guiding the end-effector to the flower. In other implementations, the location of the flower may be determined and the end-effector may move to the location without further guidance. In addition, a rangefinder or other distance sensor may be used in some implementations to assist in identifying the location of a flower and guiding an end-effector.

Next, in block 114, once the end-effector has been moved proximate to the identified location of the flower, the end-effector applies an indicator tag (e.g., any of the tag designs discussed above) to the flowering plant proximate the identified location of the flower, e.g., around a stem proximate the flower. Control then returns to block 108 to repeat blocks 110-114 for any additional flowers located in the original digital image.

Once all flowers have been processed, block 108 then returns control to block 102 to move the end-effector to a new position and capture a new digital image, e.g., to capture a digital image of another area of the same flowering plant or of a different flowering plant in a crop. Method 100 may then continue until tags have been applied to all applicable flowers in a crop of flowering plants.

Figure 7:
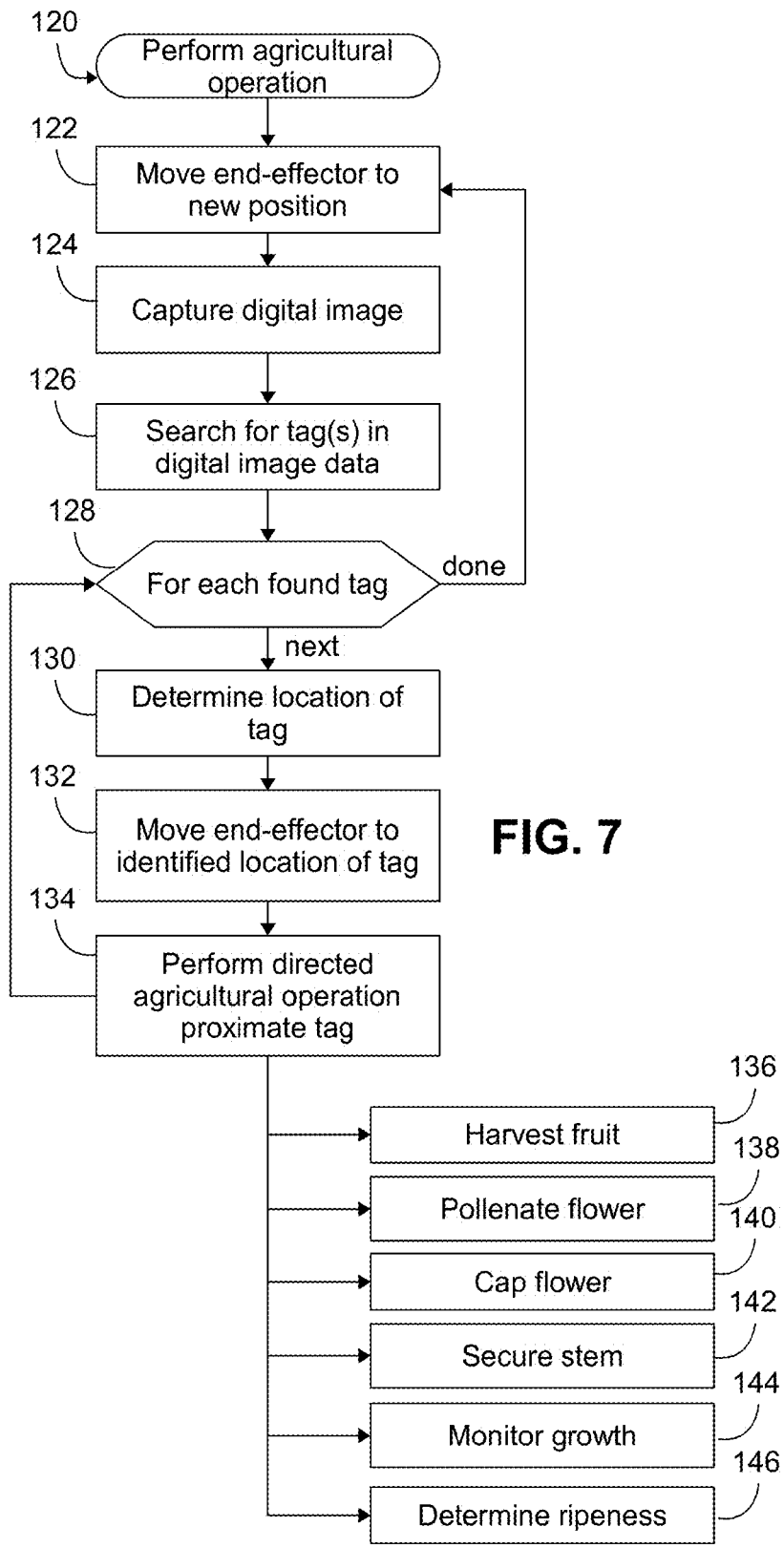
FIG. 7 is a flowchart illustrating an example method of performing an agricultural operation using an indicator tag.

FIG. 7 next illustrates a complementary method 120 for performing an agricultural operation using the previously-applied indicator tags. Method 120 may be performed, for example, by a robotic device within a field or growing facility, and the operations may be performed by the robotic device in a full autonomous matter in some implementations, while in other implementations the operations may be performed by a semi-autonomous robotic device, e.g., a robotic device mounted on human-controlled machinery. The robotic device may be the same robotic device used to perform method 100, or may be a different robotic device configured to perform various types of agricultural operations. In addition, if multiple agricultural operations are performed over the course of a growing season, different robotic devices specialized for different agricultural operations, or including different end-effectors specialized for different agricultural operations, may perform method 120 at different points in time. As with method 100, in some implementations all of the computational operations for method 120 may be performed locally by a robotic device, while in other implementations a robotic device may be in communication with a remote computer system that handles a portion of the computational operations.

Method 120 begins in block 122 by moving the end-effector to a new position, e.g., by moving the end-effector itself and/or moving the entire robotic device to a new position relative to a flowering plant or to a new flowering plant. Then, in block 124, a digital image is captured, and in block 126, the digital image data from the digital image is processed to search for one or more indicator tags in the captured image. In block 126, a tag recognition algorithm may be used to attempt to locate any indicator tags in the captured image. The tag recognition algorithm may be tuned or trained to locate the particular tags applied to a flowering plant, and when the tags are configured to be visually distinct from the flowering plant, generally a less complex algorithm is required than would generally be the case of a recognition algorithm tasked with locating fruits on a flowering plant. In other implementations, blocks 124 and 126 may differ based upon the particular tags being detected, e.g., for tag designs where electromagnetic radiation is emitted by an end-effector to visually or electronically interact with a tag.

Next, in block 128, a FOR loop is performed to process each tag located in the captured digital image. For each such tag, the location of the tag in a three-dimensional space may be identified in block 130, and the end-effector may be moved to the identified location of the tag in block 132. It will be appreciated that the identification of the location of the tag and the movement of the end-effector may be an iterative process in some implementations, e.g., whereby new digital images are captured as the end-effector is moved toward the tag to assist in guiding the end-effector to the tag. In other implementations, the location of the tag may be determined and the end-effector may move to the location without further guidance. In addition, a rangefinder or other distance sensor may be used in some implementations to assist in identifying the location of a tag and guiding an end-effector.

Next, in block 134, once the end-effector has been moved proximate to the identified location of the tag, a directed and automated agricultural operation may be performed at the site of the tag. A non-exclusive list of potential operations is illustrated by blocks 136-146. As illustrated by block 136, for example, a harvesting operation may be performed to harvest a fruit that has developed proximate the location of the tag. In some implementations, harvesting may include grabbing or grasping the indicator tag with the end-effector and manipulating the indicator tag to collapse a loop and sever a stem around which the indicator tag has been wrapped. In other implementations, harvesting may include grabbing or grasping a fruit directly, but using the location of the indicator tag to substantially narrow the search space for locating the fruit on the flowering plant.

As another example, as illustrated by blocks 138 and 140, some agricultural operations may be directed to the flowers associated with particular tags. For example, flowers may be pollinated and/or flowers may be capped to prevent pollination. In some implementations, for example, it may be desirable to select only a subset of flowers from which to produce fruit to improve the quality of the resulting fruit.

As another example, as illustrated by block 142, it may be desirable to secure a stem of the flowering plant proximate an indicator tag to a predetermined location. By doing so, further operations may be performed on the flowering plant with the location of a flower and/or fruit produced therefrom known and locatable without the use of image recognition.

As yet another example, as illustrated by blocks 144 and 146, an agricultural operation may be directed to monitoring the growth of a flowering plant or fruit thereof, which may include determining the ripeness of a fruit. Image processing may be performed, for example, to determine a size and/or color of a fruit, and in some implementations, e.g., where a tag includes a VOC sensor, ripeness may be determined based upon VOCs emitted by the fruits when ripening.

Other agricultural operations directed to the sites of the flowers and/or fruits of a flowering plant, as identified via applied indicator tags, may be performed in other implementations. For example, a fruit-producing flower may be transfected with a genetic sequence (also referred to as a floral dip). Further, multiple agricultural operations may be combined in some implementations, e.g., to detect which fruits are ripe and harvest only the ripe fruits.

Returning to FIG. 7, after performing an agricultural operation, control returns to block 128 to repeat blocks 130-134 for any additional tags located in the original digital image. Once all tags have been processed, block 128 then returns control to block 122 to move the end-effector to a new position and capture a new digital image, e.g., to capture a digital image of another area of the same flowering plant or of a different flowering plant in a crop. Method 120 may then continue until agricultural operations have been performed for all of the applied tags in a crop of flowering plants.

One benefit of the aforementioned implementations is the potential simplification of the machine perception systems and algorithms needed for implementation. Rather than having to recognize particular shapes and colors of fruits, fruit-producing flowers, which tend to be easier to detect across a wider variety of plant species, may be detected, and after tags are applied to a flowering plant, often a relatively simple machine perception system/algorithm that is customized for the particular characteristics of an indicator tag may be used to later identify the location of a flower and/or fruit produced therefrom to perform future agricultural operations. The reduced challenge of identifying the locations of flowers and tags relative to fruits may therefore lead to greater accuracy and less computational expense and complexity. In addition, the need for species-specific customizations of machine perception algorithms may be reduced due to the greater similarity of flowers across species, as well as the ability to reuse the same tag design for multiple species.

Various modifications may be made in other implementations. For example, it may be desirable in some implementations to store the identified locations of flowers and/or indicator tags (e.g., within a three-dimensional (3D) map) in connection with applying the tags such that when an agricultural operation is performed at a later point in time, the identified locations may be retrieved and used to narrow the search space for locating indicator tags, thereby reducing the time spent attempting to locate indicator tags in a crop of flowering plants. In addition, in some implementations, no tags may be applied, and the identified locations of flowers may simply be stored in a robotic device or in a remote system to enable the locations to be retrieved at a later point in time and used to narrow the search space when performing subsequent agricultural operations on the flowers and/or fruit produced therefrom.

Figure 8:
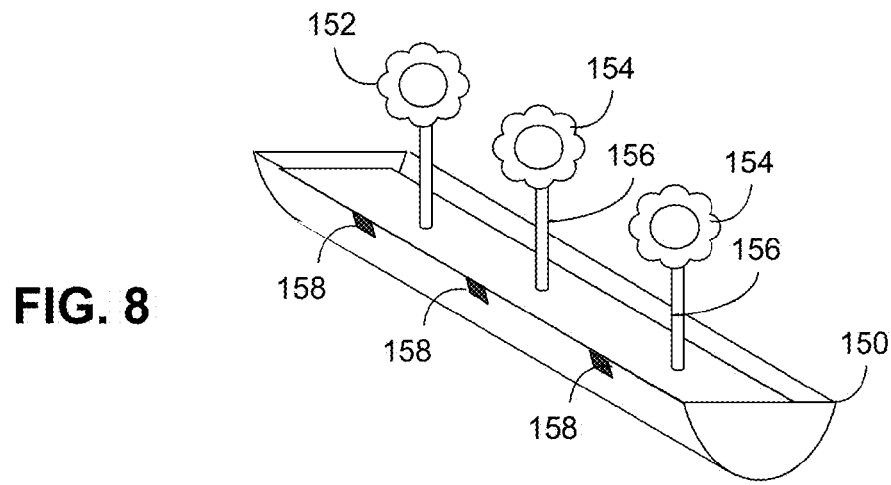
FIGS. 8-10 are perspective views illustrating an example method of anchoring a fruit-producing flower and performing an automated agricultural operation thereon.
Figure 9:
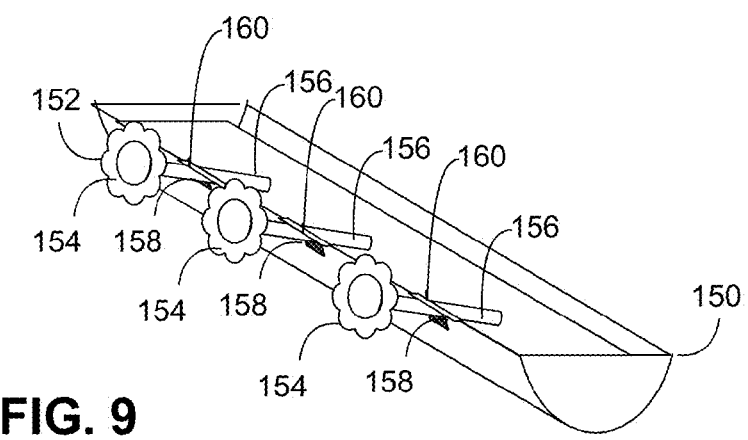
Figure 10:
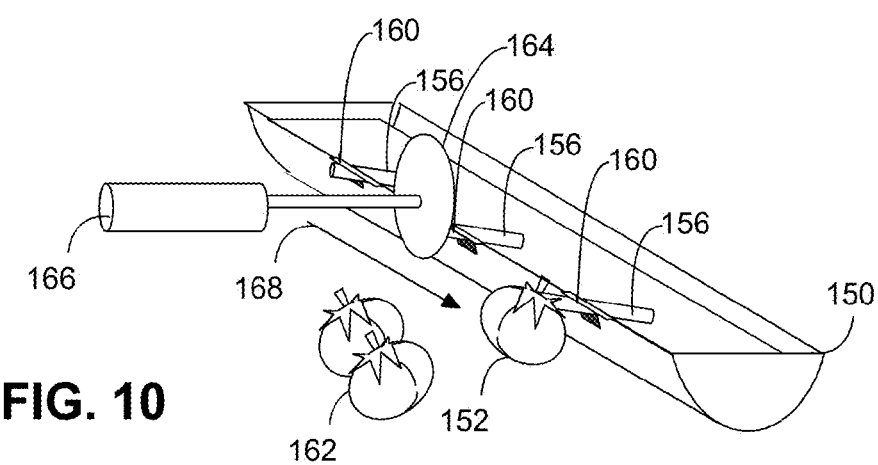

Another implementation of the techniques disclosed herein is illustrated in FIGS. 8-10. In this implementation, rather than applying indicator tags, the identification of a flower on a flowering plant is combined with a manipulation of the flowering plant to anchor a stem of the flowering plant to a predetermined location so that the location of the fruit that is ultimately produced from the flower is fixed. In such an implementation, an indicator tag is not required, and future agricultural operations are performed on the flowering plant based upon the fixed and known location(s) to which the flowering plant is anchored.

As an example, FIG. 8 illustrates a growing system incorporating a tray 150 (e.g., a half-cut PVC pipe including a growing medium such as soil. Seeds may be planted at predetermined spacings along tray 150 to produce flowering plants 152 at predetermined locations along the tray. As illustrated in FIG. 8, each plant 152 may include one or more flowers 154 supported by stems 156. Rather than applying tags to the stems, however, a robotic device may move along the tray anchor stems 156 in slots 158 positioned at predetermined locations along the tray. For example, as shown in FIG. 9, the end-effector of a robotic device may move along tray 150 and identify the locations of flowers in a similar manner to that described above in connection with FIG. 6. For each such location, the end-effector may grab or grasp the stem 156 and anchor the stem within a corresponding slot 158. One or more closures 160 may be placed over each slot 158 once a stem is positioned within the slot, such that the stem is effectively anchored at a predetermined location that is both fixed and known from the standpoint of performing further agricultural operations, and without the need for further image processing or recognition.

As shown in FIG. 10, for example, once fruit 162 is produced by each flowering plant 152, the locations of the fruit are both fixed and known, and harvesting of the fruit may be performed in an automated manner simply by severing each stem along the edge of the tray. In one implementation, for example, a rotating cutting blade 164 driven by an actuator 166 may move along a predetermined path 168 to harvest fruit 162 along the length of the tray. In some implementations, such an operation may be a simple mechanical harvesting operation, e.g., running a spinning blade along a fixed track, and in some implementations no automation or robotics may be required to perform the agricultural operation. In other implementations, however, such agricultural operations may be automated in nature.

Figure 11:
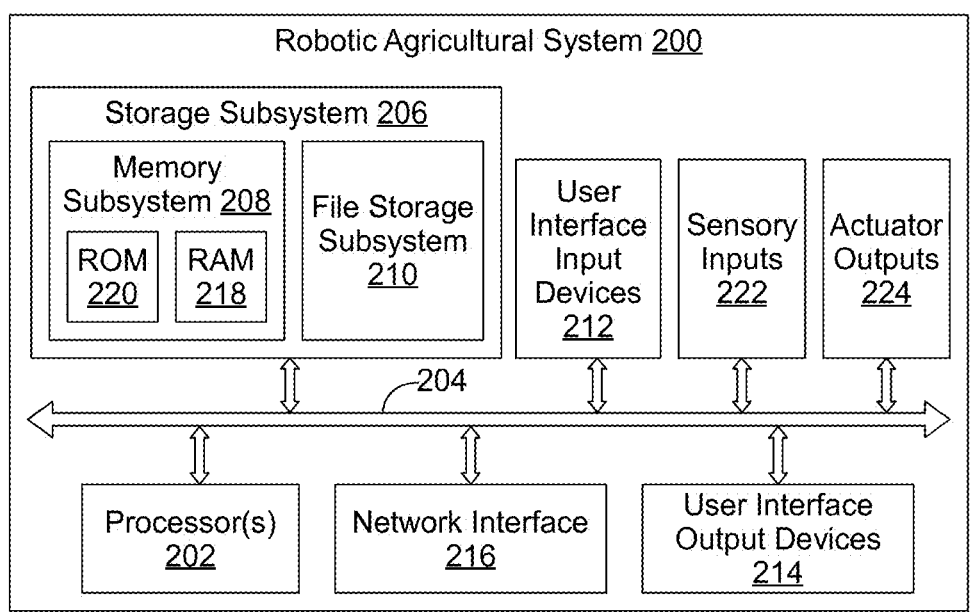
FIG. 11 illustrates an example robotic agricultural system.

FIG. 11 is a block diagram of electronic components in an example robotic agricultural system 200. System 200 typically includes at least one processor 202 which communicates with a number of peripheral devices via bus subsystem 204. These peripheral devices may include a storage subsystem 206, including, for example, a memory subsystem 208 and a file storage subsystem 210, user interface input devices 212, user interface output devices 214, and a network interface subsystem 216. The input and output devices allow user interaction with system 200. Network interface subsystem 216 provides an interface to outside networks and is coupled to corresponding interface devices in other computer systems.

In some implementations, user interface input devices 212 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into system 200 or onto a communication network.

User interface output devices 214 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from system 200 to the user or to another machine or computer system.

Storage subsystem 206 stores programming and data constructs that provide the functionality of some or all of the modules described herein. For example, the storage subsystem 206 may include the logic to perform selected aspects of the methods of FIG. 6 and/or FIG. 7.

These software modules are generally executed by processor 202 alone or in combination with other processors. Memory subsystem 208 used in storage subsystem 206 can include a number of memories including a main random access memory (RAM) 218 for storage of instructions and data during program execution and a read only memory (ROM) 220 in which fixed instructions are stored. A file storage subsystem 210 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 210 in the storage subsystem 206, or in other machines accessible by the processor(s) 202.

Bus subsystem 204 provides a mechanism for allowing the various components and subsystems of system 200 to communicate with each other as intended. Although bus subsystem 204 is shown schematically as a single bus, alternative implementations of the bus subsystem may use multiple busses.

System 200 can be of varying types including a workstation, server, computing cluster, blade server, server farm, or any other data processing system or computing device. Due to the ever-changing nature of computers and networks, the description of system 200 depicted in FIG. 11 is intended only as a specific example for purposes of illustrating some implementations. Many other configurations of system 200 are possible having more or fewer components than the computer system depicted in FIG. 11.

Furthermore, as implemented within a robotic agricultural application, system 200 may also include additional inputs and/or outputs configured to operate components of a robotic device. Sensory inputs 222, for example, may include components such as digital cameras, microphones, and other environmental sensors, as well as additional sensors providing feedback as to the position or orientation of movable components in a robotic device. Actuator outputs 224, for example, may include communication links to actuate motors and other actuators to control the movement of a robotic device. It will be appreciated that other components conventionally found in robotic devices may also be incorporated into system 200 as appropriate. Moreover, system 200 may implement, among other functionality, a machine perception system that receives inputs from various sensory inputs 222, including an image capture device, and processes the inputs to evaluate the surrounding environment, e.g., to identify flowers and/or tags in the implementations discussed herein.

In some embodiments, system 200 may be implemented wholly within a robotic device. In other embodiments, system 200 may be partially or wholly implemented remotely from a robotic device, but in communication therewith to control the various operations described herein.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method, comprising:
receiving digital image data of at least a portion of a flowering plant;
processing the received digital image data to identify a location of a fruit-producing flower on the flowering plant; and
prior to production of a fruit by the fruit-producing flower, controlling an end-effector of a robotic device to apply an indicator tag to a stem of the flowering plant proximate the identified location of the fruit-producing flower, the indicator tag being configured for detection by a machine perception system to identify a location of the fruit produced by the fruit-producing flower.

2. The method of claim 1, further comprising:
locating the indicator tag with the machine perception system; and
performing a directed and automated agricultural operation on the flowering plant proximate the indicator tag.

3. The method of claim 2, wherein performing the directed and automated agricultural operation includes harvesting the fruit.

4. The method of claim 3, wherein harvesting the fruit includes manipulating the indicator tag to sever the stem and thereby separate the fruit from the flowering plant.

5. The method of claim 4, wherein the indicator tag includes a collapsible loop that circumscribes the stem, and wherein manipulating the indicator tag includes collapsing the collapsible loop to sever the stem.

6. The method of claim 5, wherein the indicator tag includes a cable tie portion including a cable that projects through a catch to define the collapsible loop, wherein controlling the end-effector of the robotic device to apply the indicator tag includes drawing the cable through the catch to a first position, and wherein manipulating the indicator tag to sever the stem includes drawing the cable further through the catch beyond the first position.

7. The method of claim 6, wherein the cable tie portion includes at least one cutting element configured to cut the stem when the cable is further drawn through the catch.

8. The method of claim 2, wherein at least a portion of the indicator tag is reflective, and wherein locating the indicator tag includes detecting a reflection of electromagnetic radiation with the machine perception system.

9. The method of claim 8, wherein locating the indicator tag further includes emitting the electromagnetic radiation with the machine perception system.

10. The method of claim 8, wherein the indicator tag includes a reflector element that is reflective in multiple directions.

11. The method of claim 10, wherein the indicator tag is configured to hang the reflector element below the stem and below an occluding structure of the flowering plant.

12. The method of claim 2, wherein the directed and automated agricultural operation includes pollinating the fruit-producing flower, capping the fruit-producing flower to inhibit pollination, transfecting the fruit-producing flower, performing a targeted application of an agricultural fertilizer, pesticide or herbicide to the flowering plant, moving and affixing the stem of the flowering plant to a predetermined location, monitoring growth of the fruit, or determining ripeness of the fruit.

13. The method of claim 2, further comprising storing the location of the fruit-producing flower, wherein locating the indicator tag with the machine perception system includes retrieving the location of the fruit-producing flower to narrow a search space for locating the indicator tag with the machine perception system.

14. The method of claim 2, wherein the robotic device is a first robotic device, and wherein locating the indicator tag and performing the directed and automated agricultural operation on the flowering plant are performed by the first robotic device or a second robotic device.

15. The method of claim 1, wherein receiving the digital image data and processing the received digital image data are performed by the robotic device.

16. The method of claim 1, wherein the fruit comprises a vegetable agricultural product, a fruit agricultural product, or a nut agricultural product.

17. The method of claim 1, wherein the indicator tag comprises a Volatile Organic Compound (VOC) sensor.

18. An apparatus, comprising:
a robotic device including an end-effector configured to apply an indicator tag to a flowering plant; and
a control system coupled to the robotic device and configured to receive digital image data of at least a portion of the flowering plant, process the received digital image data to identify a location of a fruit-producing flower on the flowering plant, and prior to production of a fruit by the fruit-producing flower, control the end-effector to apply the indicator tag to a stem of the flowering plant proximate the identified location of the fruit-producing flower, wherein the indicator tag is configured for detection by a machine perception system to identify a location of a fruit produced by the fruit-producing flower on the flowering plant.

19. The apparatus of claim 18, wherein the robotic device further includes an image capture device configured to collect the digital image data.

20. A method, comprising:
receiving digital image data of at least a portion of a flowering plant;
processing the received digital image data to identify a location of a fruit-producing flower on the flowering plant;
prior to production of a fruit by the fruit-producing flower, anchoring a stem of the flowering plant proximate the identified location of the fruit-producing flower to a predetermined location using a robotic device; and
after production of the fruit by the fruit-producing flower, performing an agricultural operation on the flowering plant with the stem of the flowering plant anchored in the predetermined location.

21. The method of claim 20, wherein the agricultural operation includes harvesting the fruit with the stem of the flowering plant anchored in the predetermined location.

22. The method of claim 21, further comprising processing received digital image data for a plurality of flowering plants to identify locations of a plurality of fruit-producing flowers and using the identified locations to control an end-effector of the robotic device to anchor a plurality of stems proximate the plurality of fruit-producing flowers to a plurality of predetermined locations, wherein performing the agricultural operation includes performing a cutting operation along a predetermined path between the plurality of predetermined locations to harvest fruit from the plurality of flowering plants.

* * * * *